(12) United States Patent
Alvarez, Jr.

(10) Patent No.: US 6,241,955 B1
(45) Date of Patent: Jun. 5, 2001

(54) METHOD AND APPARATUS FOR PURIFICATION OF HYDRIDE GAS STREAMS

(75) Inventor: Daniel Alvarez, Jr., San Diego, CA (US)

(73) Assignee: Aeronex, Inc., San Diego, CA (US)

( * ) Notice: Subject to any disclaimer, the term of this patent is extended or adjusted under 35 U.S.C. 154(b) by 0 days.

(21) Appl. No.: 09/165,791

(22) Filed: Oct. 2, 1998

(51) Int. Cl.[7] ............... B01D 53/02; C01B 13/00; C01B 31/20
(52) U.S. Cl. .............. 423/210; 95/116; 95/117; 95/138; 95/139; 423/215.5; 423/219; 423/230
(58) Field of Search .................. 423/219, 220, 423/210, 299, 352, 592, 605, 606, 215.5, 230; 502/305, 324; 95/116, 117, 138, 139

(56) References Cited

U.S. PATENT DOCUMENTS

| | | | |
|---|---|---|---|
| 4,781,900 | * 11/1988 | Tom et al. | 423/210 |
| 4,976,944 | 12/1990 | Pacaud et al. | |
| 5,391,364 | * 2/1995 | Cogliati | 423/335 |
| 5,496,778 | 3/1996 | Hoffman et al. | |
| 5,660,809 | * 8/1997 | Costa et al. | 423/592 |
| 5,716,588 | 2/1998 | Vergani et al. | |
| 5,855,862 | * 1/1999 | Grenier et al. | 423/605 |

FOREIGN PATENT DOCUMENTS

| | | |
|---|---|---|
| 0 784 595 B1 | 5/1998 | (EP) . |
| 0865814 | 9/1998 | (EP) . |
| 02144114 | 6/1990 | (JP) . |
| 03012304 | 1/1991 | (JP) . |
| 03040901 | 2/1991 | (JP) . |
| 03040902 | 2/1991 | (JP) . |
| 04124001 | 4/1992 | (JP) . |
| 07081901 | 3/1995 | (JP) . |
| WO 97/06104 | 2/1997 | (WO) . |

OTHER PUBLICATIONS

Xie et al., "Decomposition of Nitric Oxide, over Barium Oxide Supported on Magnesium Oxide. 1. Catalytic Results and in Situ Raman Spectroscopic Evidence for a Barium–Nitro Intermediate", *J. Amer. Chem. Soc.*, 119:10186–10191 (1997).

* cited by examiner

*Primary Examiner*—Wayne Langel
(74) *Attorney, Agent, or Firm*—Brown Martin Haller & McClain LLP

(57) ABSTRACT

A process and apparatus for the decontamination of gaseous contaminants (especially oxygen, carbon dioxide and water vapor) from hydride gases (including their lower alkyl analogs) down to $\leq 100$ ppb contaminant concentration are described. The critical component is a high surface area metal oxide substrate with reduced metal active sites, which in various physical forms is capable of decontaminating such gases to $\leq 100$ ppb, $\leq 50$ ppb or $\leq 10$ ppb level without being detrimentally affected by the hydride gases. The surface area of the substrate will be $\geq 100$ m$^2$/g, and preferably 200–800 m$^2$/g. Oxides of various metals, especially manganese or molybdenum, can be used, and mixtures of integrated oxides, or one type of oxide coated on another, may be used. The substrate is preferably retained in a hydride-gas-resistant container which is installed in a gas supply line, such as to a gas- or vapor-deposition manufacturing unit. The invention provides final decontamination for hydride gas streams intended for gas- or vapor-deposition formation of high purity LED, laser (especially blue laser), electronic, optical or similar products, and can be used in combination with upstream preliminary decontamination process and/or upstream or downstream solid particulate removal units.

17 Claims, 1 Drawing Sheet

METHOD AND APPARATUS FOR PURIFICATION OF HYDRIDE GAS STREAMS

BACKGROUND OF THE INVENTION

1. Field of the Invention

The invention herein relates to the removal of contaminants from streams of ammonia and related gases. More particularly it relates to the production of substantially contaminant-free streams of ammonia and related hydride gases for use in the production of semiconductors and similar products which cannot tolerate the presence of such contaminants during manufacture.

2. Description of the Prior Art

Recent advances in integrated circuit semiconductor technology have included the development of semiconductors with copper interconnects instead of aluminum interconnects. Copper interconnects are advantageous in that copper has less resistance than aluminum, which leads to higher performance in microprocessors, microcontrollers and random access memories.

However, copper tends to migrate over a period of time, so it is necessary to construct barrier layers in the semiconductor to prevent the copper migration. Such boundary layers are typically made of nitrides such as tantalum nitride, titanium nitride or silicon nitride. These layers are commonly formed by deposition from a hydride gas, such as ammonia or silane gas.

Further, ammonia is widely used as a source of nitrogen for film development in some thin film applications. The ammonia allows for lower temperature film growth in chemical vapor deposition (CVD) processes.

In addition, there is current research to develop high performance light emitting diodes (LEDs). These are made by metal organic chemical vapor deposition (MOCVD). Trialkyl gallium is deposited as gallium nitride from a gaseous mixture of ammonia and hydrogen. Similar, gallium nitride is being considered for "blue lasers," i.e. lasers which emit blue light. Because blue light has a shorter wavelength than red, yellow or green light, blue lasers are anticipated to be capable of forming compact disks which will have a much higher information density than is presently the case with compact disks produced with red laser light. Gallium nitride for such blue lasers would be manufactured from the same type of ammonia/hydrogen gaseous environment as described above for the high capacity LEDs.

The LEDs, blue lasers and integrated circuits are all manufactured with electron accepting p-type dopants. Such products are extremely sensitive to the presence of electron-donating n-type materials, and very small concentrations of such n-type material are sufficient to deactivate the p-type dopants and impair or destroy the performance and operability of the integrated circuits, LEDs and blue lasers. Oxygen is a particularly efficient n-type material, and the presence of molecular oxygen is detrimental to the desired band gap properties in the semiconductor material. Even very low concentrations of oxygen (<100 ppb, usually <50 ppb, even <10 ppb) can be sufficient to cause sufficient significant reduction in performance or operability so as to require discarding of the product after manufacture.

Water vapor and carbon dioxide gas are two other detrimental contaminants in hydride gases, and which lead to degradation of products which are formed by deposition of active layers of metals or metal compounds from a hydride gas environment. Water is one of the most common and yet most difficult impurities to remove from the gases. Water is of course ubiquitous in almost all ambient environments. Even systems which are nominally referred to as "dry" usually have significant amounts of water, and most drying processes can reduce the moisture content of a gas only to a "minimum" which is still in the parts per million (ppm) range. However, since for many purposes water contents in the ppm range are quite acceptable, there are numerous patents and articles in the literature dealing with such types of "ppm drying processes."

In the manufacture of the aforesaid LED, blue laser and integrated circuit products, however, moisture contents of the depositing gases which are in the ppm range are excessively wet. To form satisfactory products, the water content of the depositing gases must be reduced to the parts per billion (ppb) range, usually down to no more than about 100 ppb. See Whitlock et al, "High Purity Gases," in Ruthven, ed., ENCYCLOPEDIA OF SEPARATION TECHNOLOGY, vol. 1, pp. 987–1000 (1997).

Attempts to use materials such as reduced nickel or copper catalysts to remove contaminants such as oxygen, carbon dioxide and water from hydride gases have not been successful. While contaminant removal can be effected for short periods of time down to the 10 ppb level, the reactive effects of the hydride gases, especially ammonia, very quickly cause the materials to degrade and contaminate the gas stream with metal complexes. Though pre-existing impurities may be reduced, the introduction of new impurities to the manufacturing process is unacceptable.

Some prior art processes have been described in which oxygen has been removed from ammonia streams by metals serving as "getters." However, these have been relatively ineffective at reaching sufficiently low levels of decontamination. In addition, the getters are deposited on substrates, such as silica or zeolites, which do not play a central role in the decontamination process, and also may themselves be degraded by the hydride gases. See, for instance, U.S. Pat. Nos. 5,496,778 (Hoffman et al.), 5,716,588 (Vergani et al.) and 4,976,944 (Pacaud et al.); PCT publication No. WO 97/06104 (SAES Getters S.p.A.); and European Patent No. EP 0 784 595 B1 (SAES Getters S.p.A.). In particular, some of these references teach that manganese:iron ratios of >2:1 as depositions on such substrates are detrimental to getter performance and are to be avoided. The references specifically teach that very low manganese:iron ratios, usually about 0.12–0.16:1, are to be preferred. Further, the reference processes are usually not effective for removal of carbon dioxide or water, as compared to oxygen, from ammonia gas streams.

Consequently, the problem of removal of contaminant levels down to $\leq 100$ ppb from hydride gases remains a significant problem in the field of production of high purity LEDs, blue lasers, semiconductors, and the like. Those processes which are being used are expensive because of the very short service life of the decontaminating materials and the need for their frequent replacement. In addition, since it is difficult to determine the exact rate of deterioration of the decontaminating materials in the presence of the reactive hydride gases, users of such decontaminating materials must schedule their discard and replacement at intervals less than the shortest expected service life. To do otherwise would risk failure of a decontamination unit with the resultant loss of contaminated product when the excessive contaminant concentrations reaches the production chamber through the failed unit. Consequently, the current systems require that many if not most of the decontamination units must be discarded while they still have some degree of useful service life left, thus further increasing the expense of the system operations.

In most high-purity product manufacturing processes, it has been conventional for hydride gases to be stored in and supplied from standard gas cylinders. The volume of gas in each such cylinder is of course limited, so that in larger scale manufacturing processes, it becomes necessary for process operators frequently to replace emptied cylinders and replace them with fresh, full cylinders. This frequent handling and movement of heavy, awkward gas cylinders represents a safety hazard to the operators, as well as providing opportunities for gas leakage and increasing the cost of manufacturing. Also importantly, each time an empty gas cylinder is detached from the system and a new full cylinder attached, there is an opportunity for ambient contaminant gases, such as oxygen, carbon dioxide and water vapor, to enter the system, thus increasing the decontamination load on the system and accelerating the system degradation. The industry is beginning to require gases to be supplied in large volume containers which need to be changed only at infrequent intervals (usually measured in months rather than hours, as with the individual gas cylinders). A preferred type of large volume container is the "tube trailer," a semi-trailer which is constructed with a number of "tubes," high capacity extended high pressure vessels, which are interconnected or operate through a common manifold. A tube trailer can be parked at a manufacturing facility and attached to the gas supply system, and will typically have sufficient gas capacity to supply the hydride gas to the facility for a period of months. This eliminates the need for frequent handling and changes of conventional gas cylinders and reduces dramatically the number of times that the system needs to be opened for cylinder changes and thus exposed to ambient contaminant infiltration. Equally importantly, since the tube trailer is usually parked outside the manufacturing building, it also positions the gas supply outside, so that any gas leakage does not endanger the operators and access to the leaking vessels for repair or containment is greatly simplified.

SUMMARY OF THE INVENTION

We have now developed a unique and highly effective process for the removal of gaseous contaminant concentration from hydride gases down to $\leq 100$ ppb concentration. This decontamination process can be operated for long periods of time in the presence of these gases, since the critical material used is not susceptible to degradation by the hydride gases. The invention also includes the unique compositions and their various configurations as used in this process, as well as apparatus for containing the compositions, and which is adapted to be mounted in a gas conduit delivering the gas or vapor to a gas- or vapor deposition chamber.

In particular, we have discovered that a high surface area metal oxide substrate can function as an active substrate to remove gaseous contamination from hydride gas streams. Unlike the prior art processes, the use of the metal oxides as the substrates permits manganese:iron and similar metal ratios to be much higher than those of the prior art, for instance on the order of 6–8:1, while obtaining good removal of not only oxygen from the hydride gas stream but also carbon dioxide and water vapor. The principal hydride gases of interest are hydrogen, ammonia, phosphine, arsine, diborane, silane and disilane, and their lower alkyl analogs.

For purposes of this invention, "hydride gases" may be defined as those gases in which the predominant component is a gaseous hydride or a comparable gaseous compound containing an active hydride moiety, or a gas having reaction properties generally equivalent to ammonia, including but not limited to the lower alkyl derivatives of ammonia and its hydrides analogs. As noted above, the principal examples include $H_2$, $NH_3$, $PH_3$, $AsH_3$, $B_2H_6$, $SiH_4$ and $Si_2H_6$, and their lower alkyl derivatives such as $R_aNH_b$, where a and b are both 0–3 and a+b=3. It will also be understood that a process gas stream may contain a single hydride gas or mixtures of hydride gases, or may contain one or more hydride gases mixed with other, non-reactive or non-contaminating gases. Of course in any gas mixture the gases must be compatible with and inert toward each other, except as may be required by the particular manufacturing process involved.

The metal oxides of interest will be those metal oxides which can form a solid substrate having a surface area of $\geq 100$ m$^2$/g, preferably an area in the range of 200–800 m$^2$/g. Principal metal oxides which have such surface areas are various manganese oxides followed by the molybdenum oxides, although oxides of barium, calcium, iron, lithium, potassium, rhenium, sodium, strontium, titanium, tungsten and vanadium are also anticipated to have such surface areas. Such materials will be made by progressive reduction of a metal oxide ($MO_x$) from its highest metal oxidation state to a lower oxidation state in order to create reduced metal active sites disposed throughout the oxide body. Preferably the reduction will be conducted to produce the lowest oxidation state in which the metal oxide will retain its structural integrity in the presence of the moving gas stream and with the reduced metal active sites present. Thus x may range in value <1 to 7 or greater, and need not be an integer value. Reduction is usually by heating of the metal oxide in the presence of hydrogen or another reducing agent. It will be understood that reduction does not proceed in discrete steps, so that for a metal which can assume multiple oxidation states, it will commonly be found that the reduced oxide product will actually be a mixture of two or more oxides of different metal oxidation states with some reduced metal active sites dispersed throughout the oxide mass. The specific compositions of such mixtures are not of concern in this invention, as long as the resulting mixed oxide product retains its structural integrity in the presence of the hydride gas stream, the surface area of the mixed oxide product remains $\geq 100$ m$^2$/g and there are reduced metal active sites present. Similarly, oxides of different metals and the reduced metals can be used together. The preferred metal is manganese, and the preferred mixing metal is iron, and the preferred oxides are those respectively of manganese and iron. Normally the manganese and manganese oxides will be present as at least 80% of the mixed composition. Making such mixtures of metals and their oxides can be used advantageously to allow use of metal and metal oxides which have good decontamination properties but would not otherwise have sufficient structural integrity, since they can be incorporated into the structural network of the more structurally stable oxides.

While the exact mechanism involved in the present invention is not fully known, it is believed that the metal oxide(s) in the form of a porous solid substrate with the requisite surface area contacts the gaseous contaminants as, entrained in the hydride gas stream, they pass through the body and over the surface of the substrate, and are removed from the hydride gas stream by a combination of reaction with the reduced metal active sites and adsorption on the substrate surface. The substrate therefore is believed to be an active component in the system, and is not merely an inert deposition surface as in the case with other substrates in many prior art processes.

Also part of the present invention is apparatus for decontaminating a hydride gas stream, in which the decontaminating substrate is housed in a container through which the contaminated hydride gas stream passes. A decontaminant container may conveniently be paired with one or more particulate removal units placed either or both upstream or downstream of the decontaminant container. In the gas of hydride gases such as silane, which can form particulate silicon oxides during gas decontamination, downstream placement is preferred for removal of the formed silicon oxides.

The container is normally a relatively simple device, conveniently generally cylindrical, in which the decontaminating material is housed. The contain has inlet and outlet gas ports so that the hydride gas stream can enter, flow through and leave the container. Within the container the gas stream contacts the decontaminating material, as will be described below, and substantially all of the contaminant oxygen, carbon dioxide and/or water vapor is removed from the gas stream.

Therefore, in one broad embodiment, the invention is of a method of removing a contaminant from a gas stream of hydride gas which comprises contacting the gas stream with a quantity of high surface area metal oxide substrate having reduced metal active sites therein for a period of time sufficient to sequester the contaminant on the substrate by reaction therewith or adsorption thereon, the substrate having a surface area of at least 100 $m^2/g$, and reduce concentration of the contaminant in the gas stream to not more than 100 ppb, with the high surface area substrate being substantially unaffected by the hydride gas.

In another broad embodiment, the invention is of apparatus for removing a contaminant from a gas stream of hydride gas comprising a container comprising a gas-tight chamber therein, a gas inlet port and a gas outlet port penetrating the container and respectively providing fluid communication for flow of the gas into the chamber from the exterior of the container and out of the chamber to the exterior of the container, and retained within the chamber a high surface area metal oxide substrate having reduced metal active sites therein and having a surface area of at least 100 $m^2/g$, the gas stream containing the contaminant remaining within the chamber for a period of time sufficient to sequester the contaminant on the substrate by reaction therewith or adsorption thereon, and reduce concentration of the contaminant in the gas stream to not more than 100 ppb, with the high surface area substrate being substantially unaffected by the hydride gas.

Other embodiments, features and applications will be evident from the descriptions below.

DETAILED DESCRIPTION AND PREFERRED EMBODIMENTS

Figure 1:
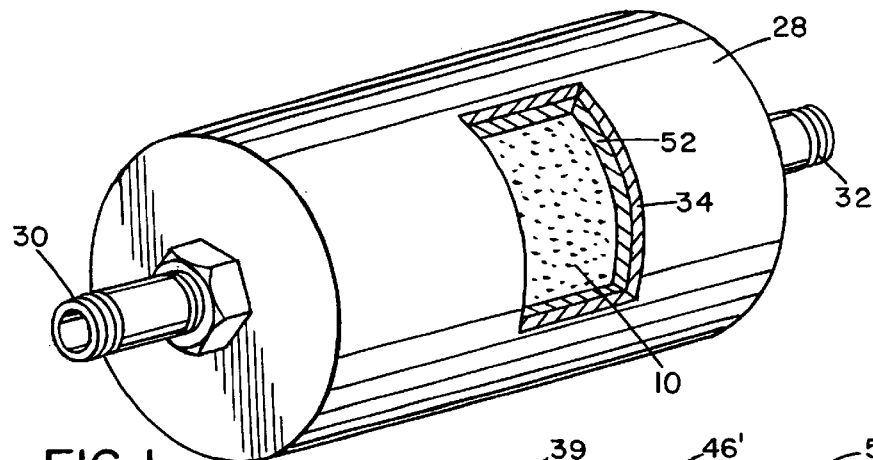
FIG. 1 is an oblique view, partially cut away, of a canister for containment of the high surface area metal oxide decontamination substrate for use in this invention.

The critical aspect of the present invention is the use of an active high surface area metal oxide substrate for removal of gaseous contaminants, notably oxygen, carbon dioxide and water vapor, from a hydride gas stream. Reduction of contaminant level is to a level $\leq 100$ ppb, preferably $\leq 50$ ppb, and most preferably 10 ppb. (It is recognized that for some hydride gases, contaminant measuring equipment currently generally available may not be capable of measuring contaminant concentration as low as 10 ppb. However, for the purpose of this invention, it will be assumed that such equipment will be developed and will be available in due course. The availability, or lack thereof, of appropriate measuring equipment does not, however, alter the various levels of decontamination which are called for and can be achieved in the present invention.)

As noted above, many different metals and their oxides are useful in the present invention, as long as they have the requisite high surface area and maintain their structural stability (either alone, mixed or in combination with another metal oxide which has greater structural integrity in the present of the hydride gas stream). By "structural integrity" is meant that the metal oxide substrate can resist erosion or breakage in the presence of the flowing gas stream, and does not deteriorate by suffering reduction of surface area below the minimum 100 $m^2/g$ limit.

For brevity herein, the invention will be exemplified by manganese oxides, which are the preferred oxides for the present invention. Manganese is known to form at least six oxides, which are, in descending order of oxidation state of manganese, $Mn_2O_7$, $MnO_2$, $Mn_2O_3$, $Mn_3O_4$, $MnO$ and $MnO_2$, followed by metallic $Mn°$; see, generally, Greenwood et al., CHEMISTRY OF THE ELEMENTS (2nd edn: 1997). It has been found that, starting with the highest oxidation state one must heat the oxides to progressively higher temperatures in the presence of a reducing agent to achieve reduction, ultimately requiring a temperature of about 1200° C. to reduce the oxides completely to metallic manganese. However, in the present invention it is not desirable to reduce all of the manganese oxides all the way to metallic manganese, since the structural networks composed primarily of the metal and the lower oxidation state oxides do not have sufficient surfaces areas to effectively decontaminate the hydride gases for reasonable lengths of service life. Consequently, in the present invention reduction is limited to that degree of reduction which results in a oxide (or usually in an oxide mix, since reduction does not proceed step-wise) substrate which contains areas or sites of reduced metal activity, and has adequate structural integrity and sufficient minimum surface area of at least 100 $m^2/g$, preferably $\geq 200$ $m^2/g$, and more preferably in the range of 200–800 $m_2/g$. Fortunately, this limited degree of reduction also has the advantage that obtaining such reduction requires significantly lower reduction temperatures, such that good manganese oxide substrates can be obtained by heating usually to no more than about 500°–600° C., and in some cases to as low as 200°–400° C. The actual mixtures of manganese oxides (with reduced active metal sites) achieved by such reductive heatings are not normally known with certainty, since mixtures are not normally analyzed. The exact composition of the mixture is not significant, however, since it is the overall averaged substrate properties which are important.

It will be understood, of course, that the temperatures and temperature ranges, as well as the range of metal oxidation states and number of oxides, described above are specific to manganese. Other metallic elements will show similar properties, but the specific temperature ranges, metal oxidation state ranges, number of applicable oxides, and resultant mixture compositions, will differ for each element. In some cases certain oxides (e.g., BaO) will have sufficient surface area and activity without reduction, but normally they will be in mixtures where other oxides do require reduction to produce an acceptable overall substrate product. Those skilled in the art will have no difficulty determining the appropriate values and operating conditions for any oxides of interest. (For the purpose of this invention, the term "metallic oxides" will include not only oxides of metallic elements but also the oxides of Group 1A and 2A elements, to the extent that they have the requisite structural and surface area properties.)

Several variations of structure are possible. For instance, there may be two or more metals used as the oxides. One desirable mixture is of manganese oxides and iron oxides in a ratio of about 80%–85% manganese oxides to 15%–20% iron oxides. The incorporation of the iron oxides into the overall oxide composition provides a "promoter effect," which permits the reduction to be conducted at lower reaction temperatures and still achieve reduced manganese oxides which have adequate structural integrity and surface area. Similar effects can be obtained by inclusion of oxides of elements such as calcium, cobalt, molybdenum, nickel, rhenium, titanium and tungsten. This permits production of decontaminant substrates in situations where to require higher temperatures could raise production problems.

Further, one can integrate oxides of one metal with oxides of another metal, to get the decontaminant function of the first metal oxides in situations where they alone would not have sufficient structural strength to function in the present invention. By integrating them into or coating them onto a more structurally sound body of a second oxide group, their advantageous decontamination properties can be utilized notwithstanding their lack of independent structural integrity.

As described above, we will refer to "hydride gases" herein as those gases in which the predominant component is a gaseous hydride or a comparable gaseous compound containing an active hydride moiety, or mixtures thereof with each other and/or with non-corrosive compatible gases. Principal examples include $H_2$, $NH_3$, $PH_3$, $AsH_3$, $B_2H_6$, $SiH_4$ and $Si_2H_6$ and their lower alkyl analogs. Presently disilane gas is used commercially in the highest volume, but it is anticipated that ammonia volume use will be increasing.

Figure 2:
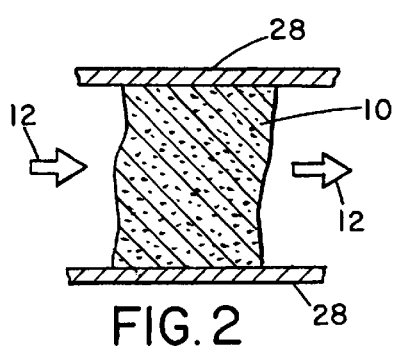
FIG. 2 is a schematic sectional view illustrating a porous substrate in which the contaminated hydride gases contact the substrate and decontaminated as they pass through and over the substrate body.

The high surface area metal oxide substrates can be used in a variety of different embodiments. As illustrated in FIG. 2, one can simply pass the gas through a body 10 consisting substantially or essentially of the substrate, either in a block form or as a body of granules, to the extent that the substrate is sufficiently porous by itself, as indicated by the arrows 12. The substrate can also be in the form of a body of comminuted fine powders. However, using such powders will cause a significant pressure drop in the gas stream, so it is preferred to used a powdered form of the substrate only in high gas pressure systems. It is thus possible to have different forms of the high surface area substrate for gas streams of different pressures, by using different particle sizes.

Figure 3:
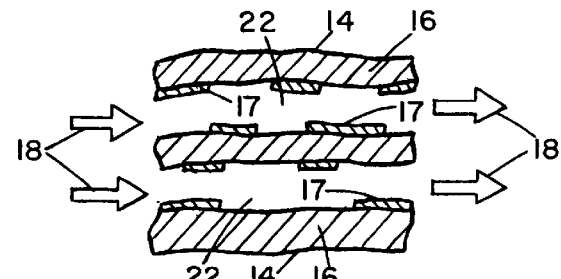
FIG. 3 is a schematic sectional view illustrating use of an oxide substrate in the process of this invention to decontaminate the hydride gases as they pass over and through and contact the substrate.

Alternatively, as shown in FIG. 3, the high surface area metal oxide substrate can be in the form of one or more thin sheets 14. A single oxide (or oxide mixture) can be used, or oxides of two or more metals may be integrated into the substrates, along with the respective reduced metal active sites. Also as illustrated in FIG. 3, one family of oxides can be used as the substrate 16 with a second type of oxide as a coating 17 over portions of the substrate surface or the surfaces of pores 22 in the substrate. In either case the hydride gas is flowed over, through and/or between the sheets as indicated by the arrows 18. Unlike prior art active coatings on inert substrates, the second oxide coating 17 must not cover the entire surface of the active substrate 16, since that will prevent the active participation of the substrate itself in the decontamination process. It is preferred that the second oxide coating actually cover less than 50% of the substrate surface, and preferably less than 25%.

Typically the inlet hydride gases for decontamination will have contaminant gas contents in the range of about 1–2 ppm, and the outlet, decontaminated hydride gases will have contaminant gas contents no greater than about 100 ppb, preferably no greater than 50 ppb, and most preferably no greater than 10 ppb. (As noted, limitations in current instrumentation may permit only determination that the actual contaminant level is less than the detection level of the instrument.)

In the present invention it is most convenient to have the reactive high surface area oxide substrate (however configured) to be used in decontamination step 46 (FIGS. 4 and 5) to be contained within a hydride-gas-resistant housing or canister 28, such as shown in FIG. 1. The canister 28 has a gas inlet port 30 and a gas outlet port 32, with the substrate 10 retained within the canister 28 in one of the forms described above, as illustrated in the cut-away section of canister wall 34. Typically, for flow lines for various common gas streams to be decontaminated, one will be dealing with gas flow rates in the range of about 0.1–4000 standard liters of gas per minute (slm) and desired lifetimes in the range of 6–24 months or more. Operating temperatures of the gases may range from 0°–65° C. (32°–150° F.) and maximum inlet pressures to the canister 28 are commonly in the range of about 15–3600 psig ($10^3$–$2.5 \times 10^6$ kPa). While any convenient container may be used, preferred are cylindrical canisters 28 with diameters in the range of about 1–30 in. (2½–75 cm) and lengths of 3–48 in. (10–120 cm). The canister size will be dependent upon the gas flow space velocity, the activity of the high surface area oxide substrate, and the amount and type of gaseous contaminants to be removed, since it is necessary to have sufficient residence time in the canister 28 to reduce the contaminant content of the hydride gas to or below 100 ppb.

Figure 4:
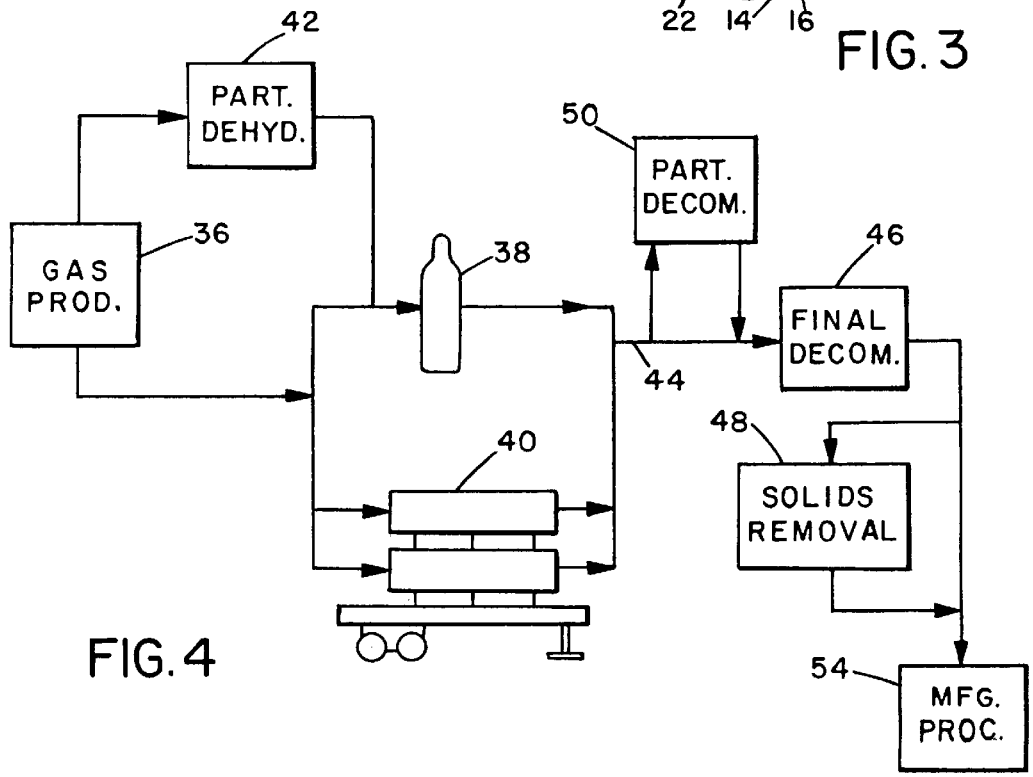
FIG. 4 is a block diagram illustrating the use of the present invention in a hydride gas decontaminating system for a gas- or vapor-deposition manufacturing process.

It may be advantageous, as shown in FIG. 4, to position a conventional "ppm" dehydration unit 42 (such as a gas scavenger unit) upstream of the decontamination process 46 of the present invention to provide preliminary reduction of the gaseous contaminant concentration down to a level in the ppm range, preferably and if possible down to a level of 0.5–1 ppm. This of course will reduce the required residence time for the hydride gas in decontamination 46 and also allow significant extension of the service life of the canister 28 and substrate because of the reduced quantities of contaminants which will need to be removed from the gas by reaction with and adsorption by the substrate to get the final water content in the exit gas down to the 100 ppb, or preferred 10–50 ppb, level or less before it passes to the product manufacturing process 54.

Also as illustrated in FIG. 4, it will be advantageous to use the process, material and equipment of the present invention in gas production facilities where the original high purity hydride gases are produced for shipment to the ultimate product manufacturers. Commonly, hydride gases in bulk are produced by the gas supply companies as at 36 and commonly then loaded into and shipped in familiar steel pressure cylinders 38 or tube trailers 40. This system can be modified by passing the produced gases through a system 42 of the present invention, but which is designed for only partial decontamination, before they are loaded into the cylinders 38 or tube trailers 40 for shipment to the customers. It will be understood that the volume of hydride gas being transferred to the cylinders or trailers by the manufacturer is usually such that it is usually not economically justified to try to reduce the gaseous contaminant content down to the final 100 ppb for delivery to the manufacturer's facility. Normally some contaminants, especially oxygen or water vapor, are likely to reenter the gas while being connected to the customer's gas supply system. Also, decontamination to the final level for such a large volume of hydride gas will take longer than is justified when filling large numbers of cylinders 38 or trailers 40. However, the value of usage of the system of this invention is that the cylinders 38 or tube trailers 40 of gas then arrive at the ultimate manufacturers' facilities with a greatly reduced contaminant content, such that they can be attached to the gas feed line 44 and pass through the decontamination unit 46 of the present invention for the final reduction to the low contaminant content needed for the production process 54, without requiring an intermediate decontaminant reduction step 50. (Such a step may be advantageously used, however, if the gas in cylinders 38 or trailers 40 has not had a prior partial decontamination in unit 42. Partial decontamination 50 may thus be an alternative to partial decontamination 42, to reduce the amount of contaminants which must be removed in the final decontamination unit 46.)

It is also advantageous in most gas delivery systems to include a particulate removal unit 48 either upstream, or preferably downstream of decontamination unit 46, to eliminate any particulate matter which has entered from a cylinder 38 or tube trailer 40 (or some other source). As noted above, one potential source is some of the hydride gases themselves, especially silane, which can react to form particles of silicon oxides.) Such solids (particulate) removal units are conventional, and will be of a type made of hydride-gas-resistant materials.

Figure 5:
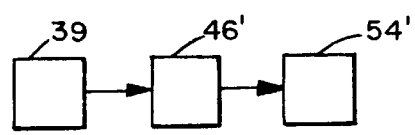
FIG. 5 is a block diagram illustrating a smaller scale "point of use" decontamination system of the present invention.

A second manner of use of the present invention is for "point of use" decontamination, as illustrated in FIG. 5. In this simpler system, there is a source of the hydride gas 39 (which may be a cylinder 38 or tube trailer 40, or some smaller or more localized source unit), which delivers the gas to the local reaction chamber 54'. Just prior to entry into the local chamber 54' there is positioned a local decontamination canister 46', so that there is a decontamination step immediately before the gas enters the reaction chamber. This system can be independent for small scale production or it can be a supplemental step in the larger system of FIG. 4 inserted just before production unit 54 as indicated in phantom.

The containers or canisters 28 for the high surface area oxide substrates which make up the devices of the present invention will be made of electropolished 316 stainless steel or other metal which is resistant to hydride gas corrosion (especially in the presence of water vapor contamination of the hydride gases) or they can be coated on the inside with a hydride-gas-resistant coating 52, as illustrated in FIG. 1. In most cases these coatings will simply be inert materials which are resistant to hydride corrosion, but which do not contribute significantly to decontamination of the gas. However, It may be desirable to make the coating 34 on the inside of the container 28 from the high surface area oxide substrate, so that one can obtain decontamination along the walls of the container 28 in addition to the decontamination occurring at and within the substrate bodies, coated substrates, coated porous substrates, etc. within the container itself.

It will be recognized that while the invention has been characterized in terms of use with gases for semiconductor and other electronic substrate manufacturing, it will be of similar value with respect to treatment of any hydride gases that are used for deposition of component materials for any other type of high purity product where moisture content is detrimental to the product's production. This could include, for instance, production of high purity substrates or other types of materials for research purposes, production of optical fibers and optoelectronic devices (including lasers) and production of high purity materials that are to be used in extreme environments such as products for use in spacecraft or artificial satellites.

It will be evident from the above that there are numerous embodiments of this invention which, while not expressly stated above, are clearly within the scope and spirit of the invention. The above description is therefore intended to be exemplary only, and the actual scope of the invention is to be defined solely by the appended claims.

I claim:

1. A method of removing a contaminant from a gas stream of hydride gas which comprises contacting said gas stream with a quantity of high surface area reduced metal oxide which has a surface area of at least 100 $m^2/g$ and is in an oxidation state which is less than its maximum oxidation state but not lower than its lowest oxidation state in which it maintains its structural integrity, for a period of time sufficient to sequester said contaminant on said high surface area reduced metal oxide by reaction therewith or adsorption thereon and reduce concentration of said contaminant in said gas stream to not more than 100 ppb, with said high surface area reduced metal oxide being substantially unaffected by said hydride gas.

2. A method as in claim 1 wherein said concentration of said contaminant in said gas stream is reduced to not more than 50 ppb.

3. A method as in claim 2 wherein said concentration of said contaminant in said gas stream is reduced to not more than 10 ppb.

4. A method as in claim 1 wherein said surface area is $\geq$200 $m^2/g$.

5. A method as in claim 4 wherein said surface area is in the range of 200–800 $m^2/g$.

6. A method as in claim 1 wherein said high surface area reduced metal oxide comprises at least 80% of a first metal oxide comprising an oxide of barium, calcium, iron, lithium, manganese, molybdenum, potassium, rhenium, sodium, strontium, titanium, tungsten or vanadium.

7. A method as in claim 6 wherein said first metal oxide comprises an oxide of manganese or molybdenum.

8. A method as in claim 6 wherein the balance of said high surface area reduced metal oxide comprises a second metal oxide, said metal of said second oxide being barium, calcium, iron, lithium, manganese, molybdenum, potassium, rhenium, sodium, strontium or tungsten, and said metal of said second metal oxide being different from metal of said first metal oxide.

9. A method as in claim 6 wherein the balance of said high surface area reduced metal oxide substrate comprises a second metal oxide which provides a promoter effect, said metal of said second oxide being calcium, cobalt, molybdenum, nickel, rhenium, titanium or tungsten, and said metal of said second metal oxide being different from metal of said first metal oxide.

10. A method as in claim 1 wherein said hydride gas comprises $H_2$, $NH_3$, $PH_3$, $AsH_3$, $B_2H_6$, $SiH_4$ or $Si_2H_6$ or a lower alkyl derivative thereof.

11. A method as in claim 6 wherein said first metal oxide has deposited on portions of the surface thereof a coating comprising a second metal oxide.

12. A method as in claim 1 wherein said high surface area reduced metal oxide is formed by reduction from a first oxidation state in which a metal thereof is in a high oxidation state to a second oxidation state in which said metal thereof is in a lower oxidation state.

13. A method as in claim 14 wherein said second oxidation state is the lowest oxidation state in which said high surface area reduced metal oxide can maintain its structural integrity.

14. A method as in claim 12 wherein said reduction comprises heating of said metal oxide in said first oxidation state in the presence of a reducing agent at a temperature and for a period of time sufficient to reduce said first oxidation state to the next lower oxidation state.

15. A method as in claim 1 wherein said contaminant is a gaseous contaminant.

16. A method as in claim 14 wherein said gaseous contaminant comprises gaseous oxygen, carbon dioxide or water.

17. A method as in claim 15 wherein removal of a gaseous contaminant is preceded by or followed by a step of removal of solid particulate matter from said gas.

* * * * *